United States Patent
Hsu et al.

(10) Patent No.: US 7,139,933 B2
(45) Date of Patent: Nov. 21, 2006

(54) PRESERVING CACHE DATA AGAINST CLUSTER REBOOT

(75) Inventors: Yu-Cheng Hsu, Tucson, AZ (US); Vernon J. Legvold, Tucson, AZ (US); David F. Mannenbach, Tucson, AZ (US)

(73) Assignee: International Business Machines Corporation, Tucson, AZ (US)

( * ) Notice: Subject to any disclaimer, the term of this patent is extended or adjusted under 35 U.S.C. 154(b) by 580 days.

(21) Appl. No.: 10/600,030

(22) Filed: Jun. 20, 2003

(65) Prior Publication Data

US 2005/0005188 A1 Jan. 6, 2005

(51) Int. Cl.
*G06F 11/00* (2006.01)

(52) U.S. Cl. .................. 714/6; 714/5; 714/7; 714/8; 711/114

(58) Field of Classification Search ............. 714/5, 714/6, 7, 8; 711/114
See application file for complete search history.

(56) References Cited

U.S. PATENT DOCUMENTS

| | | | |
|---|---|---|---|
| 5,341,493 A | 8/1994 | Yanai et al. | |
| 5,448,719 A | 9/1995 | Schultz et al. | |
| 5,519,831 A | 5/1996 | Holzhammer | |
| 5,623,604 A | 4/1997 | Russell et al. | |
| 5,724,501 A * | 3/1998 | Dewey et al. ................. | 714/9 |
| 5,761,406 A | 6/1998 | Kobayashi et al. | |
| 5,774,643 A | 6/1998 | Lubbers et al. | |
| 5,828,823 A | 10/1998 | Byers et al. | |
| 6,243,831 B1 | 6/2001 | Mustafa et al. | |
| 6,295,577 B1 | 9/2001 | Anderson et al. | |
| 6,438,661 B1 * | 8/2002 | Beardsley et al. ........... | 711/144 |
| 6,516,426 B1 | 2/2003 | Forehand et al. | |
| 6,543,049 B1 * | 4/2003 | Bates et al. ................. | 717/129 |
| 2002/0078399 A1 | 6/2002 | Caulkins | |
| 2004/0250022 A1 * | 12/2004 | Jarvis et al. ................ | 711/118 |

OTHER PUBLICATIONS

"Mechanism to establish the normal/good reboot path e.g. for computer systems, in which IPL is achieved with saved persistence boot time configuration", IBM RD-438159, Oct. 10, 2000 (abstract).

* cited by examiner

*Primary Examiner*—Scott Baderman
(74) *Attorney, Agent, or Firm*—Scully, Scott, Murphy & Presser P.C.

(57) ABSTRACT

A dual cluster storage server maintains track control blocks (TCBs) in a data structure to describe the data stored in cache in corresponding track images or segments. Following a cluster failure and reboot, the surviving cluster uses the TCBs to rebuild data structures such as a scatter table, which is a hash table that identifies a location of a track image, and a least recently used (LRU)/most recently used (MRU) list for the track images. This allows the cache data to be recovered. The TCBs describe whether the data in the track images is modified and valid, and describe forward and backward pointers for the data in the LRU/MRU lists. A separate non-volatile memory that is updated as the track images are updated is used to verify the integrity of the TCBs.

29 Claims, 6 Drawing Sheets

PRESERVING CACHE DATA AGAINST CLUSTER REBOOT

CROSS-REFERENCE TO RELATED APPLICATIONS

This application is related to commonly-assigned U.S. patent application Ser. No. 10/447,868, filed May 29, 2003, by Hsu et al., entitled "Registration of Memory Portion for Preservation of Data During Reboot," incorporated herein by reference.

BACKGROUND OF THE INVENTION

1. Field of the Invention

The invention relates generally to the field of data storage in computer systems and, more specifically, to recovering data following a cluster failure and reboot in a dual cluster storage server.

2. Description of the Related Art

Computer storage devices such as storage servers have high-capacity disk arrays to backup data from external host systems, such as host servers. For example, a large corporation or other enterprise may have a network of servers that each store data for a number of workstations used by individual employees. Periodically, the data on the host servers is backed up to the high-capacity storage server to avoid data loss if the host servers malfunction. A storage server may also backup data from another storage server, such as at a remote site. The storage servers are known to employ redundant systems to provide additional safeguards against data loss. The IBM Enterprise Storage Server (ESS) is an example of such a storage server.

However, a solution is needed for protecting data when a failure occurs at one of the redundant systems and a further event triggers a reboot in the surviving system. Such reboots conventionally result in the loss of data in cache of the surviving system

BRIEF SUMMARY OF THE INVENTION

To overcome these and other deficiencies in the prior art, the present invention describes a method for recovering data following a cluster failure and reboot in a dual cluster storage server. When the storage server fails over to one cluster, and a reboot occurs, data structures that describe the data in the cache of the surviving cluster are rebuilt to enable the write data in the cache to be successfully destaged to disk.

In a particular aspect, a method for safeguarding data in a multi-cluster storage server includes maintaining respective data structures that describe data stored in respective caches of the clusters. For each cluster, the data is provided in track images of the respective cache, and the respective data structures include track control blocks that describe the data in the track images. Following a failure of one of the clusters, the track control blocks of the surviving cluster are used to rebuild the data structures for the respective cache.

Related computer systems and computer program products are also provided.

BRIEF DESCRIPTION OF THE DRAWINGS

These and other features, benefits and advantages of the present invention will become apparent by reference to the following text and figures, with like reference numbers referring to like structures across the views, wherein.

DETAILED DESCRIPTION OF THE INVENTION

Figure 1:
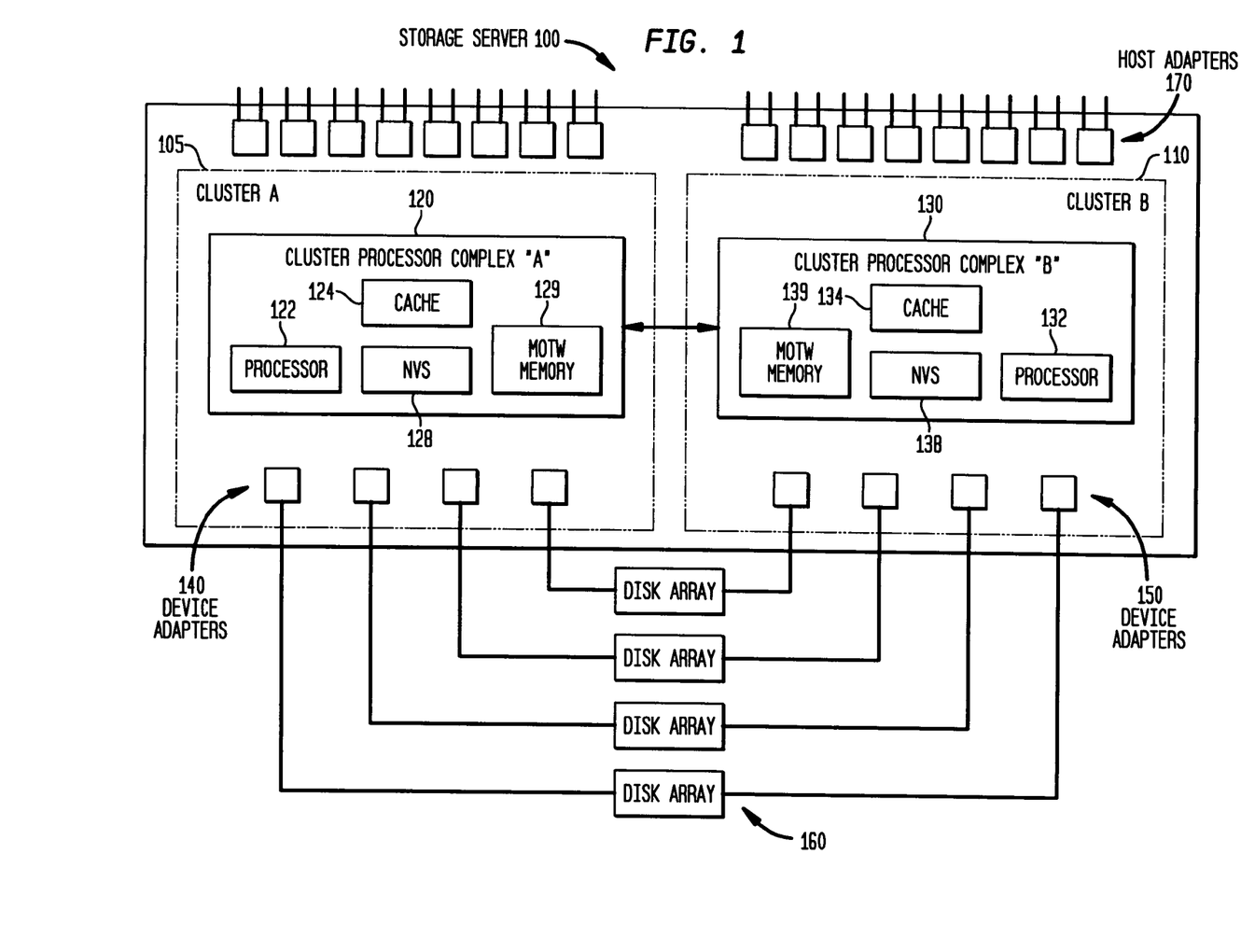
FIG. 1 illustrates an overview of a logical structure of a dual cluster storage server.

FIG. 1 illustrates an overview of a logical structure of a dual cluster storage server. A storage server 100, which may an IBM Enterprise Storage Server (ESS), for instance, is a high-capacity storage device that can back up data from a variety of different devices. For example, a large corporation or other enterprise may have a network of servers that each store data for a number of workstations used by individual employees. Periodically, the data on the host servers is backed up to the high-capacity storage server 100 to avoid data loss if the host servers malfunction. The storage server 100 can also provide data sharing between host servers since it is accessible to each host server. The storage server 100 itself has redundant storage resources to provide an additional safeguard against data loss. As a further measure, the data of the storage server 100 may be mirrored to another storage server, typically at a remote site. A storage server of a particular type, such as one that uses disk storage, may connect to one or more other peer disk storage servers as well as to other storage devices, such as those using magnetic tape. Communication between the devices may be achieved using any desired communication protocol and medium. A user interface may be provided to allow a user to access information regarding the status of the storage server 100.

The example storage server 100 includes two clusters for redundancy. Each cluster 105, 110, e.g., "A" and "B", respectively, works independently, and may include cluster processor complexes 120, 130 with cluster cache 124, 134, nonvolatile storage (NVS) 128, 138, and device adapters 140, 150. The device adapters (DA) 140, 150 are used to connect the disks 160 to the cluster processor complexes 120, 130. Each cluster 105, 110 contains four device adapters 140, 150. Each adapter is part of a pair, one on each cluster. A pair supports two independent paths to all of the disk drives served by the pair. Each disk array is configured to be accessed by only one of the clusters. However, if a cluster failure occurs, the surviving cluster automatically takes over all of the disks. The disk arrays or ranks 160 can be configured as RAID 5 (redundant array of independent disks) or non-RAID arrays. Alternatively, another high-capacity storage medium may be used.

So-called "marks on the wall" (MOTW) memories 129 and 139 are separate non-volatile memories, such as memory cards, that store all track identifiers of the local cluster of track images that have modified data, as discussed further below.

Processors 122 and 132 execute software, firmware and/or micro code, e.g., computer code devices, stored in the respective cluster, such as in a region of the respective cache that is preserved during a reboot, or in a separate non-volatile memory, to maintain and rebuild the data structures as discussed herein.

Host adapters (HAs) 170 are external interfaces that may support two ports, e.g., either small computer systems interface (SCSI) or IBM's enterprise systems connection (ESCON), which is an Enterprise Systems Architecture/390 and zSeries computer peripheral interface. This I/O interface uses ESA/390 logical protocols over a serial interface that configures attached units to a communication fabric. For example, a remote storage server, host servers and a user interface may communicate with the storage server 100 via the HAs. Fibre channel or fibre-channel connection (FICON) has support for one channel per HA. Each HA connects to both cluster processor complexes 120, 130 so that either cluster can handle I/Os from any host adapter. A system adapter identification number (SAID) is a unique identification number automatically assigned to each HA. The storage server 100 contains four host-adaptor bays, each of which is connected to both clusters 105, 110 for redundancy.

Figure 2:
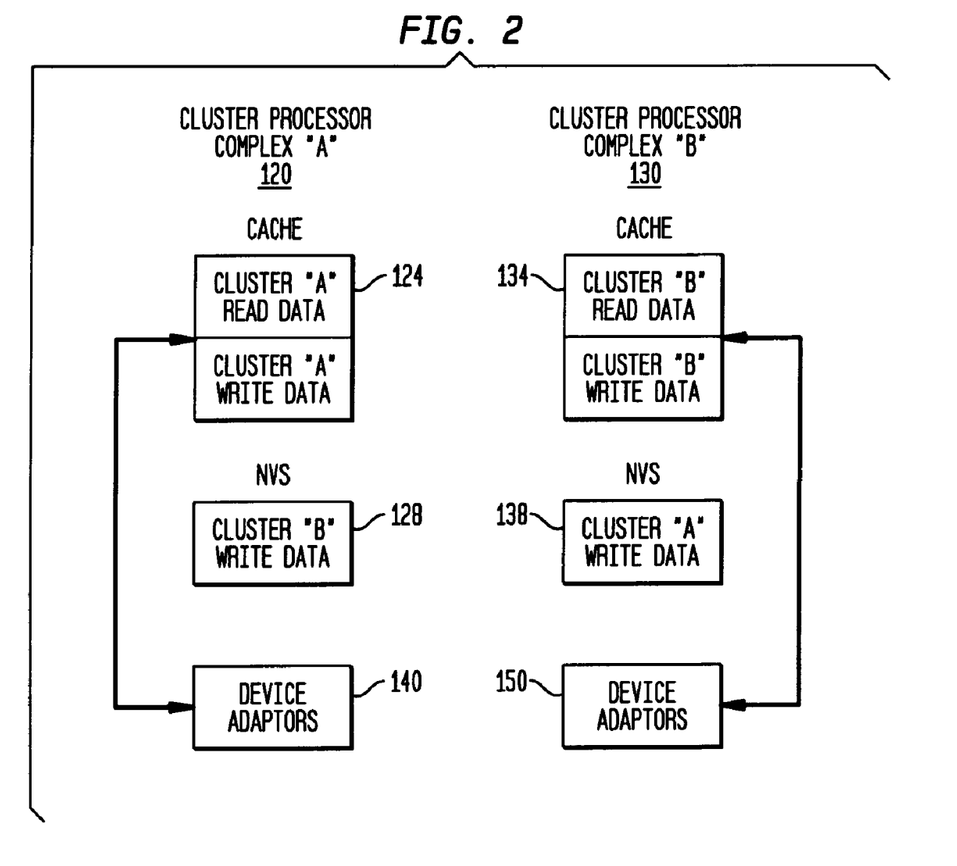
FIG. 2 illustrates the storage of data in caches and non-volatile storage during normal operation.

FIG. 2 illustrates the storage of data in caches and non-volatile storage during normal operations, e.g., with no failure. In the cluster processor complex "A" 120, the cache 124 stores read and write data for cluster A. Write data refers to data that is to be written to the disk arrays 160 or other high-capacity storage medium. For example, this may be data that is received from a host server via one of the host adapters 170. This data is to be destaged or written to the disk arrays 160 as a backup measure. Destaging generally refers to movement of data from an online or higher priority device to an offline or lower priority device. It is particularly important to safeguard the write data, since it is modified data that cannot be recovered from the disk arrays 160. Read data refers to data that has been read from the disk arrays 160 or other high-capacity storage medium. For example, this may be data that is to be communicated to a host server via one of the host adapters in a scenario where the host server has lost its data due to a failure. It is acceptable for read data to be lost from cache since it can be read again from the disk arrays. Read and write operations for the cache 124 occur via the associated device adaptors 140. The NVS 128 for cluster processor complex "A" 120 stores write data for cluster processor complex "B" 130 as a backup to the data stored in the cache 134 of cluster processor complex "B" 130.

Analogously, in the cluster processor complex "B" 110, the cache 134 stores read and write data for cluster B. The NVS 138 for cluster processor complex "B" 130 stores write data for cluster processor complex "A" 120 as a backup to the data stored in the cache 124 of cluster processor complex "A" 120. Read and write operations for the cache 134 occur via the associated device adaptors 150.

Generally, if data requested by a host resides in one of the caches 124, 134, an immediate data transfer takes place. If the data is not in the caches, one of the clusters sends a request to its device adapter to retrieve the data from the disk arrays 160. When a read operation arrives at a cluster, a cache hit occurs if the requested data resides in the cache, resulting in better performance. A cache miss occurs if the data is not in the cache. The I/O device is disconnected from the host and a stage operation occurs, which involves reading data from a disk drive into the cache. The NVSs 128, 138, which are battery backed memories, improve performance by allowing write I/O operations to complete after the data is stored in NVS, but before the data is destaged to the disk arrays 160. If a cluster fails, the surviving cluster can access the write data of the failed cluster in its local NVS. The caches 124, 134 are volatile memories that are not battery backed.

Figure 3:
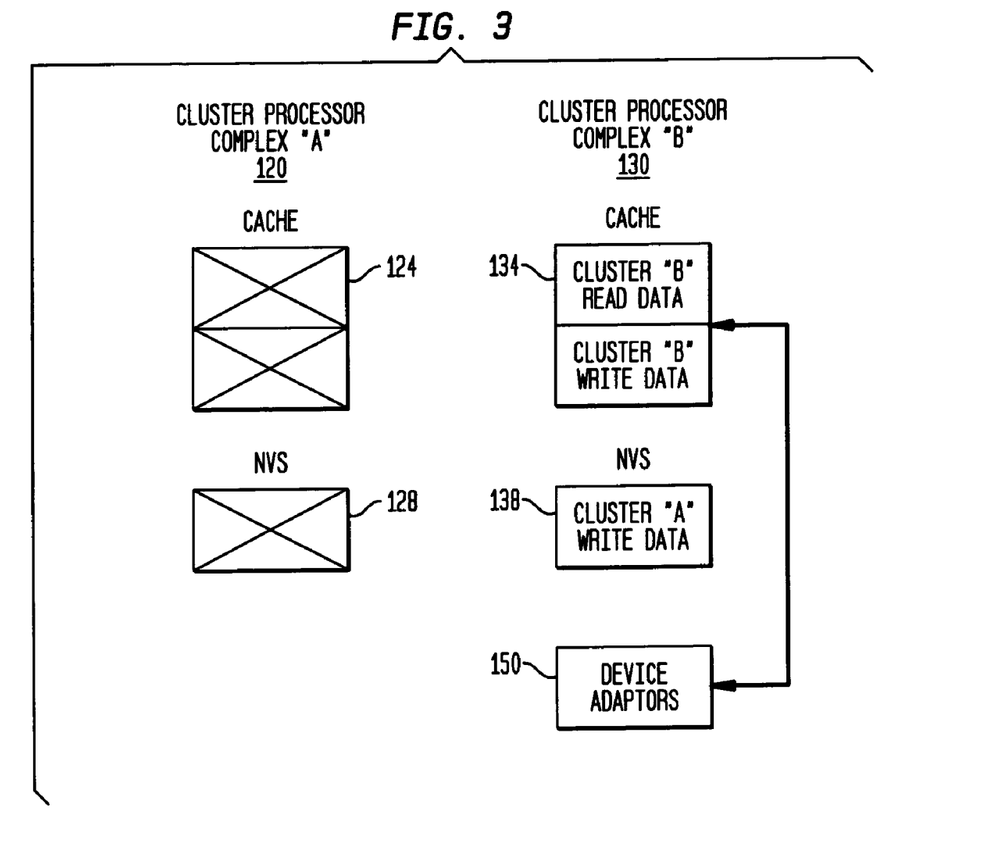
FIG. 3 illustrates the storage of data in caches and non-volatile storage at the time of a cluster failure.

FIG. 3 illustrates the storage of data in caches and non-volatile storage at the time of a cluster failure. A cluster failure can be cause by a hardware or software failure, or loss of power, for instance. Assuming cluster "A" has failed, the cache 124 and NVS 128 data will be lost or otherwise inaccessible. The only copy of the modified data, e.g., the write data, previously maintained by cluster "A" resides in the NVS 138 of cluster "B". Moreover, if the storage server 100 fails over to one cluster, and a reboot occurs, the data in the NVS 138 is preserved but the data in the cache 134 can be lost. In accordance with the invention, the write data in the cache 134 can be successfully destaged to the disk array 160 even when a second event occurs which results in a reboot of the surviving cluster, e.g., cluster "B".

In particular, when a failure occurs, micro code in the surviving cluster, e.g., cluster "B" in the present example, will register with firmware to preserve the cache region, which includes content and a logical real address. The firmware is executed by the operating system of the cluster "B" 110. An example of such an operating system is the AIX 5L Unix operating system, available from IBM Corp. For example, if cluster "B" reboots, e.g., because of a data storage interrupt (DSI), machine check or other error, before cluster "B" can destage all of the modified data in the cache 134 to the disk arrays 160, the content and logical real address of the cache 134 will be preserved. A DSI may occur, for example, when trying to write to a memory location with a bad address. In the next initial micro code load (IML), when micro code is loaded into the cache 134, cluster "B" will detect the existence of the preserved cache content. Instead of reallocating and reinitializing the cache structure/segments, the micro code will rebuild the control structure from the existing cache segments and continue the IML process.

Figure 4:
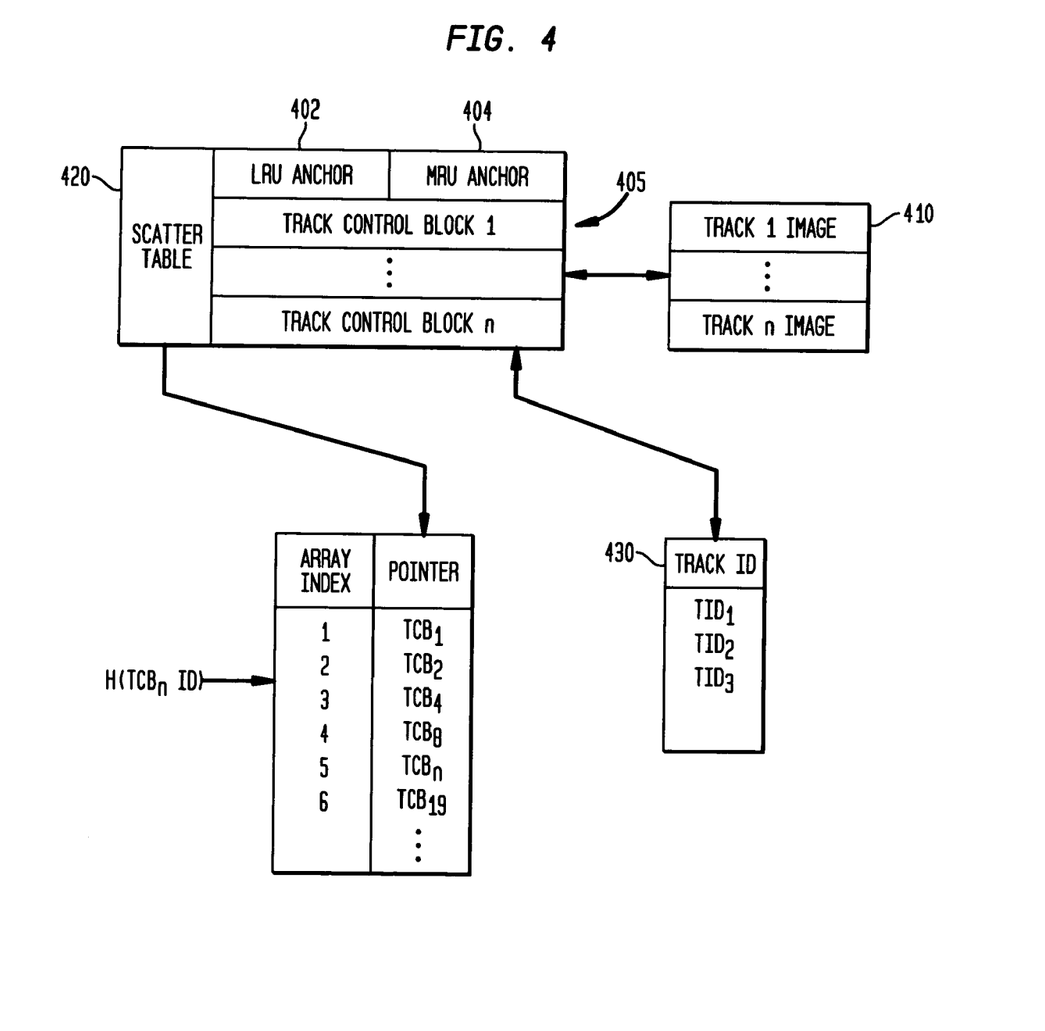
FIG. 4 illustrates data structures for describing the data in cache.

FIG. 4 illustrates data structures describing the data in cache. The cache 134 is divided into a number of track images or segments 410, in which the data is stored. Each track image is associated with a track in the disk arrays. For write data, e.g., modified data, the track image is associated with a track in the disk arrays 160 at which the associated cache data is to be written. For read data, the track image is associated with a track in the disk arrays 160 from which the associated cache data was read. Each track image may comprise the amount of data that can be stored in one revolution of a disk in the disk arrays 160, e.g., 60 kB.

The disk tracks may be identified, e.g., by device, cylinder, and head. The device can be a disk drive in the disk arrays 160, while the cylinder may be a unit of storage with a fixed number of tracks, e.g., fifteen tracks, on a disk. Typically, there are thousands of cylinders in a device. The head is the read/write head on a disk drive. Any appropriate identifier may be used. For example, the identifier of the device may be a serial number, while the identifiers of the cylinder and head may be based on their locations, e.g., cylinder 1, 2, 3, . . . , head 1, 2, 3, . . . . Moreover, track control blocks (TCBs) 405 are provided to describe the track images in cache. There is a 1:1 relationship between the TCBs 405 and track images 410.

A hash table such as a chained scatter table 420 provides a shortcut for identifying the data in cache. For example, assume a host wants to read certain data, such as a file. The storage server 100 needs to determine if the data is currently in cache, or if it needs to be read in from the disk array 160. To do this, it could scan each TCB for the cache to locate the track identifier(s) that corresponds to the data, but this would be time consuming due to the large number of TCBs. Instead, a hashing algorithm may be used to hash the track identifier (ID), discussed in connection with FIG. 5, to yield an offset into the scatter table to obtain a pointer to the desired track. However, multiple track identifiers can yield the same pointer. A chained scatter table resolves this problem. A chained scatter table includes array indexes and pointers. The pointers point to other elements in the array. To find a TCB in a chained scatter table, the track ID in the TCB is hashed to determine a location from which to begin the search. For example, assume that the identifier for a specific nth TCB, hashes to the value 016541. This may be expressed mathematically as $H(TCB\ ID_n)=016541$. Then we begin the search in array location "0". In the simplified example of FIG. 4, the corresponding pointer is $TCB_1$, e.g., the first TCB. This first TCB is located from the TCB data structure 405 according to its known position, and its track identifier (ID) is read and compared to the track ID of the nth TCB to see if there is a match. In this case, there is no match. Next, a scatter table position pointer 530 in $TCB_1$ is read to learn the location of the next TCB in the chain. Assume the pointer points to the third array location, where $TCB_4$ is present. $TCB_4$ is located in the data structure 405 and its track ID is compared to that of $TCB_n$. Again, there is no match, and the scatter table position pointer 530 of $TCB_4$ is read to lead us to the fifth array location, where $TCB_n$ is present. The track identifier of $TCB_n$ is identified as a match, and it is concluded that the data described by $TCB_n$ is in the fifth track image in the cache. The scatter table 420 is updated when tracks are added or deleted from cache. Optionally, separate chaining may be used. In another approach, the TCB identifiers may be provided in another column in the scatter table 420 so that the identifiers do not have to be read from the TCBs in the TCB data structure 405 each time to determine if there is a match.

The Least Recently Used (LRU) anchor 402 identifies which TCB is the least recently used TCB in a LRU/MRU list for the cache, while the Most Recently Used (MRU) anchor identifies which TCB is the most recently used TCB in the list. For example, these TCBs may be identified by the associated track IDs.

A MOTW data structure 430 describes data in the MOTW memories 129, 139, which store all track identifiers of the local cluster of track images with modified data. The data structure 430 includes a track identifier. Optionally, the data structure 430 also includes an offset value at which the corresponding track image can be located in cache. For example, the offset may be in terms of a number of track images or other measure. For instance, a track image may be identified as the fifth track image in cache, or having a location that is 240 kB past the start of the cache entries. In the normal operation of the storage server 100, these separate memories 129, 139 are continuously updated by adding the track identifiers for updated tracks. During a reboot and initial micro code load following a cluster failure, the MOTW memories 129, 139 can be used to verify the integrity of the TCBs by detecting discrepancies between the track identifiers in the separate memory and the track identifiers for the processed track images. That is, if a given TCB indicates the associated track image is modified, but the MOTW memory provides conflicting information, the integrity of the TCB is in question. Any modified data lost in specific track images in cache can be reported to the host. Optionally, the MOTW data structure 430 includes information on all TCBs, whether modified or not, and a flag indicates whether the data is modified or unmodified. In this case, the MOTW flag can be compared with the corresponding TCB flag to verify the integrity of the TCB when the flags agree.

Figure 5:
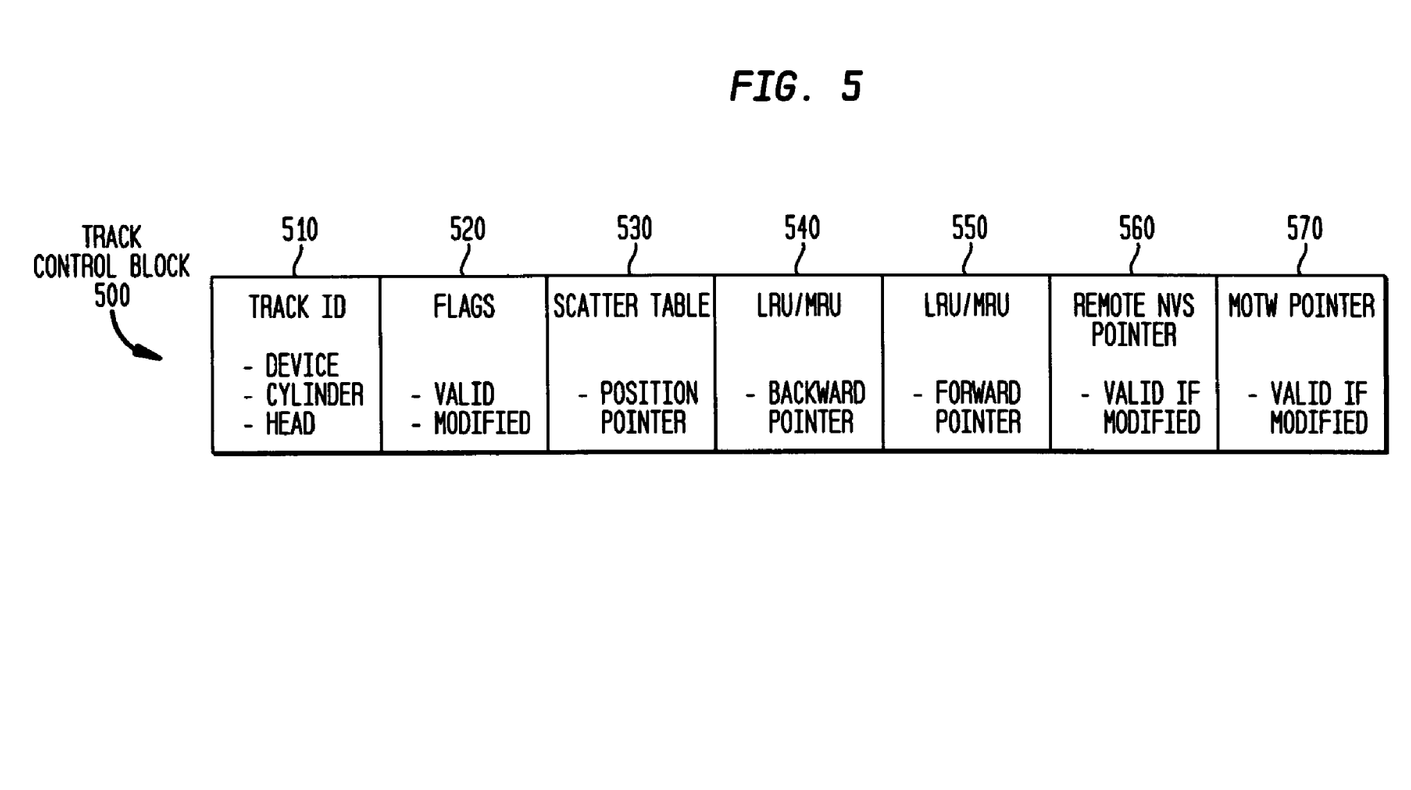
FIG. 5 illustrates details of the track control block data structure.

FIG. 5 illustrates further details of the track control block data structure. The TCB 500 includes a track identifier 510, e.g., device, cylinder, and head, as discussed. Flag 520 indicates whether the associated cache data is valid and modified. The data is valid if the TCB 500 is on the LRU/MRU list; otherwise it is invalid and on a free list. That is, if a track image in cache is not valid, it is put on an availability or free list for reuse. For example, the associated track ID may be put on the list. Since the TCBs map one-to-one with the track images, a unique track image can be identified by its TCB. The cache data is modified if it is write data, as discussed, which has not yet been destaged. Read data is not a concern since it has already been stored on disk and can therefore be easily retrieved. A scatter table position pointer 530 points to a next TCB in a chain in the chained scatter table 420. Since the scatter table is a singly linked list, only one pointer is needed. A null entry is provided if there is no further TCB in the chain. An entry 540 is an LRU/MRU backward pointer, while an entry 550 is an LRU/MRU forward pointer. A LRU/MRU list is maintained to enable the clusters to provide a fast-read access from cache by using algorithms to store data in cache that has the greatest probability of access by a read operation from a host. The LRU/MRU list is updated based on read requests from the hosts. Track images for data that is requested often will end up near the MRU end of the list, while track images for data that is infrequently requested will end up near the LRU end of the list. Thus, the same list provides LRU and MRU information when viewed from its different ends.

Each cluster checks the LRU data to locate updated track images in cache that have not been destaged. In normal operations, the cluster schedules the LRU data for the remote cluster, which includes a backup of the data of the local cache, for destaging. Once destaging of the data in a track image from the local cache is completed, the data can be deleted from the local cache and remote NVS if the space is need to store other data. Or, the deleted data can be left in cache with its status changed to unmodified data by setting the TCB flag 520 to a status of "unmodified". Also, after destaging, the track identifier (TID) is removed from the MOTW data structure 430 since this data structure is concerned with unstaged modified data. The LRU anchor 402 and MRU anchor 404 identify the TCBs that lead the LRU and MRU categories, respectively.

In particular, the backward pointer 540 and forward pointer 550 are provided to indicate the TCBs position in the LRU/MRU list. For example, the $50^{th}$ TCB points backward to the $49^{th}$ TCB, and forward to the $51^{st}$ TCB. In this case, the backward pointer 540 identifies the 49th TCB, and the forward pointer identifies the 51st TCB, such as by the associated track IDs. Moreover, these pointers are updated when the LRU/MRU list is updated. For example, assume there are 100 track images on an LRU/MRU list in cache 134, and that a host wants to access the track image represent by the $50^{th}$ TCB. Accordingly, the $50^{th}$ TCB is unlinked from the 50th position in the list and added to the top of the list. The LRU/MRU list is a doubly linked list, so each entry has two pointers, e.g., backward to the previous entry, and forward to the next entry. After the $50^{th}$ TCB is added to the top of the list, the previous $1^{st}$ through $49^{th}$ entries become the $2^{nd}$ through $50^{th}$ entries, respectively. The 51 st through $100^{th}$ entries retain their positions in the list. After the new $1^{st}$ TCB is added to the top of the list, its pointers 540, 550 are updated. There is no higher TCB in the list, so the backward pointer 540 is set to null. The forward pointer 550 is set to point to the $2^{nd}$ TCB. Likewise, what was the $49^{th}$ TCB before the update, and is now the $50^{th}$ entry, must have its forward pointer updated to point to the $51^{st}$ entry instead of the $50^{th}$ entry, and the $51^{st}$ entry must be updated to have its backward pointer point to the new $50^{th}$ entry. What was the $1^{st}$ TCB before the update becomes the 2nd TCB and has it backward pointer updated to point to the new $1^{st}$ TCB. The pointers of the other TCBs remain the same.

Also in the TCB 500 of FIG. 5, a pointer 560 points to the corresponding track image in the remote NVS. For example, for cluster "B" 110, the NVS 128 is the remote NVS, and normally stores write data for cluster "B" 100 as a backup to the data stored in the cache 134. Thus, a given track image in the cache 134 has a corresponding track image in the NVS 128, which can be identified, e.g., by the associated track ID. The pointer 560 is valid if the track image data is modified, e.g., unstaged write data. The "marks on the wall" MOTW pointer 570 points to a position of the associated TCB in the MOTW data structure 430 (FIG. 4). For example, a given TCB might be the $20^{th}$ TCB in the data structure 430. An offset to the track may be stored. The MOTW stores information for TCBs that describe track images having valid and modified data.

After a cluster failure, there is only a single copy of write data for the surviving cluster in its cache. To safeguard this data, it is desirable to quickly destage it from the cache. However, if a reboot occurs before the destaging is complete, many of the data structures will not be reliable. In particular, the track ID 510, flags 520, and MOTW 570 data are preserved after the reboot and are therefore still usable. However, the scatter table position entry 530 and LRU/MRU entries 540, 550 must be rebuilt after the reboot. The remote NVS pointer entry 560 is not usable after the failure since the remote NVS is unavailable. In accordance with the invention, the scatter table position entry 530 and LRU/MRU entries 540, 550 are rebuilt after the reboot using the TCBs, as described below. Additionally, the integrity of the TCBs is verified to ensure that the rebuilt data structures are accurate. The integrity of a TCB may be in question, for example, if a reboot occurs when a TCB is being updated.

Figure 6:
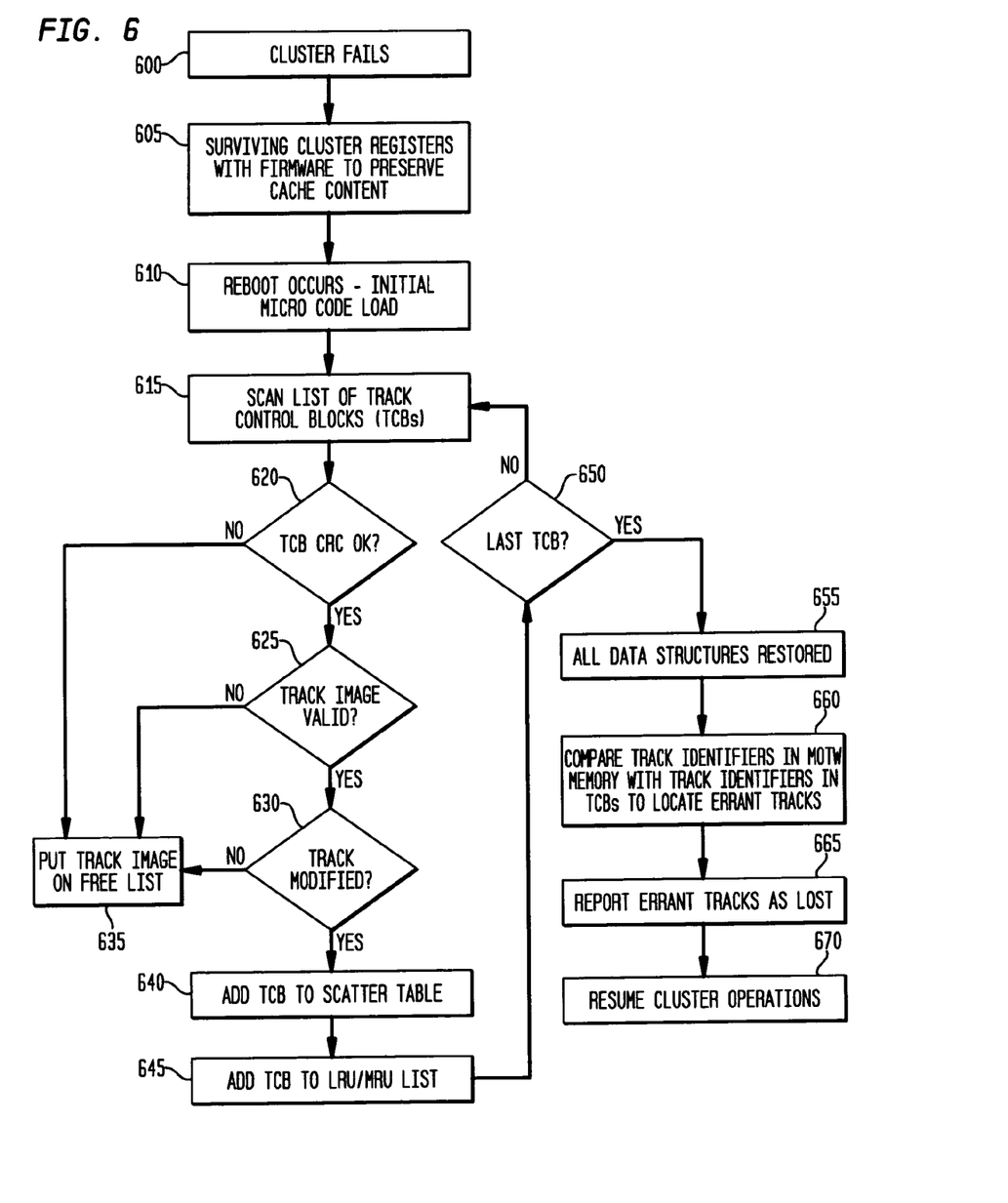
FIG. 6 illustrates a method for restoring data structures following a cluster failure and reboot.

FIG. 6 illustrates a method for restoring data structures following a cluster failure and reboot. As mentioned, if the storage server 100 fails over to one cluster, and a reboot occurs, the data in the surviving NVS is preserved but the data in the surviving cache can be lost. In accordance with the invention, data structures that describe the data in the surviving cache are rebuilt to enable the write data in the cache to be successfully destaged to disk. In particular, at block 600, a cluster failure occurs. At block 605, the surviving cluster registers with firmware in the cluster to preserve at least a portion of the cache content in which the data structures and customer data are stored. For further details, see co-pending, commonly-assigned U.S. patent application Ser. No. 10/447,868, filed May 29, 2003 by Hsu et al., entitled "Registration of Memory Portion for Preservation of Data During Reboot," incorporated herein by reference. Optionally, a separate battery-backed memory is provided for the data structures. At block 610, a reboot occurs with an initial micro code load. At block 615, scanning or reading of the track control blocks (TCBs) begins. Essentially, the TCBs in the TCB data structure 405 may be read one by one. At block 620, a cyclic redundancy check (CRC) is performed on the current TCB. If the CRC fails, the TCB cannot be trusted, and the corresponding track image is put on a free list (block 635) so that other data can be stored in the associated track image. At block 625, it is determined if the data in the currently examined track image is valid, such as by examining the flag 520 in the TCB. If the track image data is not valid, it is put on the free list (block 635). At block 630, it is determined if the data in the currently examined track image is modified, such as by examining the flag 520 in the TCB. If the track image data is not modified, it is put on a free list (block 635). If the track image data is valid and modified, the TCB is added to the scatter table (block 640). Since the scatter table is rebuilt from scratch, the TCBs are added in turn to the scatter table sequentially, starting from the first entry. Additionally, the TCB is added to the LRU/MRU list (block 645). Since the LRU/MRU list is also rebuilt from scratch, the TCBs are added in turn to the LRU/MRU list sequentially, starting from the first entry. If the current TCB is not the last TCB in the list of TCBs (block 650), the next TCB is scanned at block 615. The procedure is repeated until the last TCB is reached (block 650). At this point, all data structures have been restored (block 655).

Next, the integrity of the TCBs may be verified by comparing the track identifiers in the MOTW memory with the track identifiers in the TCBs to locate any errant tracks. As discussed, the MOTW memory stores the track identifiers of the TCBs of modified tracks. These track identifiers can be compared to the track identifiers in the TCB data structure 405. If a track identifier is in the MOTW memory but not in the TCB data structure 405 or not on the LRU/MRU list, the integrity of the TCB is not verified, and it is reported to the associated host as a lost track. The integrity of a TCB may be compromised, for example, if the TCB is in the process of being updated when a reboot occurs, in which case its contents may be altered. In another approach, where the MOTW memory contains a flag indicated whether a track is modified, this flag is compared to the corresponding TCB flag 520 to verify the integrity of the TCB, e.g., when the two flags agree. An alternative embodiment would be to destage all modified data before allowing customer access, in which case any remaining entries in the MOTW memory would identify errant tracks.

At block 670, operations in the surviving cluster can be resumed for the TCBs whose integrity can be verified. For example, modified data can be destaged, after which the hosts can access the data. In another approach, access can be allowed before destaging all modified data. Other normal operations such as the host writing new data to the cluster can also be handled. Various other approaches may be used to verify the integrity of a TCB. For example, one may simply trust the contents of the TCB, including the track identifier, if the valid flag 520 (FIG. 5) is on, without performing a CRC.

While the invention has been illustrated in terms of a dual cluster storage server, it is applicable as well to multi-cluster systems having higher levels of redundancy.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. A method for safeguarding data in a multi-cluster storage server, comprising:
maintaining respective data structures that describe data stored in respective caches of the clusters;
wherein for each cluster, the data is provided in a plurality of track images of the respective cache, and the respective data structures include track control blocks that describe the data in the track images; and
following a failure of one of the clusters, using the track control blocks of the surviving cluster to rebuild the data structures for the respective cache of the surviving cluster.

2. The method of claim 1, further comprising:
verifying an integrity of the track control blocks of the surviving cluster before using them to rebuild the data structures for the respective cache.

3. The method of claim 2, wherein:
the integrity of the track control blocks of the surviving cluster is verified following a reboot in the surviving cluster that follows the failure.

4. The method of claim 2, further comprising:
maintaining a non-volatile memory with information identifying track images containing modified data, and maintaining information in the track control blocks indicating whether the track images contain modified data;
wherein verifying the integrity of the track control blocks comprises determining whether the information maintained in the non-volatile memory corresponds with the information maintained in the track control blocks.

5. The method of claim 4, further comprising:
updating the information maintained in the non-volatile memory and in the track control blocks when data is added to, or removed from, the respective cache.

6. The method of claim 2, further comprising:
placing on a free list the track images described by track control blocks whose integrity cannot be verified to enable reuse.

7. The method of claim 1, wherein:
the data structures for the respective cache that are rebuilt include a least recently used (LRU)/most recently used (MRU) list indicating a probability of a read access by a host of the data provided in the plurality of track images of the respective cache.

8. The method of claim 7, wherein:
the LRU/MRU list is rebuilt by adding track control blocks that are determined to be valid and describe track images having modified data to the LRU/MRU list.

9. The method of claim 7, wherein:
the track control blocks include a backward pointer identifying a previous track control block in the LRU/MRU list, and a forward pointer identifying a next track control block in the LRU/MRU list.

10. The method of claim 1, wherein:
the data structures for the respective cache that are rebuilt include a scatter table that outputs information identifying locations of the track images in the respective cache.

11. The method of claim 10, wherein:
the scatter table outputs the information identifying locations of the track images in the respective cache based on hashed values of identifiers of the track control blocks.

12. The method of claim 10, wherein:
the scatter table is rebuilt by adding track control blocks that are determined to be valid and describe track images having modified data to the scatter table.

13. The method of claim 1, wherein:
rebuilding the data structures for the respective cache enables the data stored therein to be accessed.

14. A computer system for safeguarding data in a multi-cluster storage server, comprising:
memory in which respective data structures that describe data stored in respective caches of the clusters is maintained;
wherein for each cluster, the data is provided in a plurality of track images of the respective cache, and the respective data structures include track control blocks that describe the data in the track images; and
a processor for using the track control blocks of the surviving cluster to rebuild the data structures for the respective cache, following a failure of one of the clusters.

15. The computer system of claim 14, wherein:
the processor verifies an integrity of the track control blocks of the surviving cluster before using them to rebuild the data structures for the respective cache.

16. The computer system of claim 14, further comprising:
a non-volatile memory maintained with information identifying track images containing modified data, and maintaining information in the track control blocks indicating whether the track images contain modified data;
wherein the processor verifies the integrity of the track control blocks by determining whether the information maintained in the non-volatile memory corresponds with the information maintained in the track control blocks.

17. The computer system of claim 14, wherein:
the data structures for the respective cache that are rebuilt include a least recently used (LRU)/most recently used (MRU) list indicating a probability of a read access by a host of the data provided in the plurality of track images of the respective cache.

18. The computer system of claim 14, wherein:
the data structures for the respective cache that are rebuilt include a scatter table that outputs information identifying locations of the track images in the respective cache.

19. A program storage device readable by machine, tangibly embodying a program of instructions executable by the machine to perform a method of safeguarding data in a multi-cluster storage server, comprising:
computer code devices configured to cause a computer to:
(a) maintain respective data structures that describe data stored in respective caches of the clusters;
wherein for each cluster, the data is provided in a plurality of track images of the respective cache, and the respective data structures include track control blocks that describe the data in the track images; and
(b) following a failure of one of the clusters, use the track control blocks of the surviving cluster to rebuild the data structures for the respective cache of the surviving cluster.

20. The program storage device of claim 19, wherein:
the computer code devices are configured to cause a computer to verify an integrity of the track control blocks of the surviving cluster before using them to rebuild the data structures for the respective cache.

21. The program storage device of claim 20, wherein:
the computer code devices are configured to cause a computer to maintain a non-volatile memory with information identifying track images containing modified data, and maintain information in the track control blocks indicating whether the track images contain modified data;
wherein verifying the integrity of the track control blocks comprises determining whether the information maintained in the non-volatile memory corresponds with the information maintained in the track control blocks.

22. The program storage device of claim 19, wherein:
the data structures for the respective cache that are rebuilt include a least recently used (LRU)/most recently used (MRU) list indicating a probability of a read access by a host of the data provided in the plurality of track images of the respective cache.

23. The program storage device of claim 19, wherein:
the data structures for the respective cache that are rebuilt include a scatter table that outputs information identifying locations of the track images in the respective cache.

24. A method for safeguarding data in a multi-cluster storage server, comprising:
maintaining respective data structures that describe data stored in respective caches of the clusters;
wherein for each cluster, the data is provided in a plurality of track images of the respective cache, and the respective data structures include track control blocks that describe the data in the track images;
following a failure of one of the clusters, using the track control blocks of the surviving cluster to rebuild the data structures for the respective cache of the surviving cluster; wherein:
the data structures for the respective cache that are rebuilt include:
(a) a least recently used (LRU)/most recently used (MRU) list indicating a probability of a read access by a host of the data provided in the plurality of track images of the respective cache; and
(b) a scatter table that outputs information identifying locations of the track images in the, respective cache.

25. A computer system for safeguarding data in a multi-cluster storage server, comprising:
memory in which respective data structures that describe data stored in respective caches of the clusters is maintained;
wherein for each cluster, the data is provided in a plurality of tack images of the respective cache, and the respective data structures include track control blocks that describe the data in the tack images; and
a processor for using the tack control blocks of the surviving cluster to rebuild the data structures for the respective cache, following a failure of one of the clusters; wherein:
the data structures for the respective cache that are rebuilt include: (a) a least recently used (LRU)/most recently used (MIRU) list indicating a probability of a read access by a host of the data provided in the plurality of track images of the respective cache; and
(b) a scatter table that outputs information identifying locations of the track images in the respective cache.

26. A program storage device readable by machine, tangibly embodying a program of instructions executable by the machine to perform a method of safeguarding data in a multi-cluster storage server, comprising:
computer code devices configured to cause a computer to:
(a) maintain respective data structures that describe data stored in respective caches of the clusters;
wherein for each cluster, the data is provided in a plurality of track images of the respective cache, and the respective data structures include track control blocks that describe the data in the track images; and
(b) following a failure of one of the clusters, use the track control blocks of the surviving cluster to rebuild the data structures for the respective cache of the surviving cluster; wherein:
the data structures for the respective cache that are rebuilt include:
(i) a least recently used (LRU)/most recently used (MRU) list indicating a probability of a read access by a host of the data provided in the plurality of track images of the respective cache; and
(ii) a scatter table that outputs information identifying locations of the track images in the respective cache.

27. A method for safeguarding data in a multi-cluster storage server, comprising:
maintaining respective data structures that describe data stored in respective caches of the clusters;
wherein for each cluster, the data is provided in a plurality of track images of the respective cache, and the respective data structures include track control blocks that describe the data in the track images;
maintaining a non-volatile memory with information identifying track images containing modified data, and maintaining information in the track control blocks indicating whether the track images contain modified data;
following a failure of one of the clusters, using the track control blocks of the surviving cluster to rebuild the data structures for the respective cache of the surviving cluster; and
verifying an integrity of the track control blocks of the surviving cluster before using them to rebuild the data structures for the respective cache by determining whether the information maintained in the non-volatile memory corresponds with the information maintained in the track control blocks.

28. A computer system for safeguarding data in a multi-cluster storage server, comprising:
memory in which respective data structures that describe data stored in respective caches of the clusters is maintained;
wherein for each cluster, the data is provided in a plurality of track images of the respective cache, and the respective data structures include track control blocks that describe the data in the track images;
a non-volatile memory maintained with information identifying track images containing modified data, and maintaining information in the track control blocks indicating whether the track images contain modified data; and
a processor for using the track control blocks of the surviving cluster to rebuild the data structures for the respective cache, following a failure of one of the clusters;
wherein the processor verifies an integrity of the track control blocks of the surviving cluster before using them to rebuild the data structures for the respective cache by determining whether the information maintained in the non-volatile memory corresponds with the information maintained in the track control blocks.

29. A program storage device readable by machine, tangible embodying a program of instructions executable by the machine to perform a method of safeguarding data in a multi-cluster storage server, comprising:

computer code devices configured to cause a computer to:
(a) maintain respective data structures that describe data stored in respective caches of the clusters;
wherein for each cluster, the data is provided in a plurality of track images of the respective cache, and the respective data structures include track control blocks that describe the data in the track images;
(b) maintain a non-volatile memory with information identifying track images containing modified data, and maintain information in the track control blocks indicating whether the track images contain modified data;
(c) following a failure of one of the clusters, use the track control blocks of the surviving cluster to rebuild the data structures for the respective cache of the surviving cluster; and
(d) verify an integrity of the track control blocks of the surviving cluster before using them to rebuild the data structures for the respective cache by determining whether the information maintained in the non-volatile memory corresponds with the information maintained in the track control blocks.

\* \* \* \* \*